United States Patent
Furlan et al.

(10) Patent No.: US 7,453,514 B2
(45) Date of Patent: Nov. 18, 2008

(54) DIGITAL PHOTOGRAPHY DEVICE HAVING A ROLLING SHUTTER

(75) Inventors: John Louis Warpakowski Furlan, Belmont, CA (US); Ariel Braunstein, San Francisco, CA (US)

(73) Assignee: Pure Digital Technologies, Inc., San Francisco, CA (US)

( * ) Notice: Subject to any disclaimer, the term of this patent is extended or adjusted under 35 U.S.C. 154(b) by 876 days.

(21) Appl. No.: 10/431,988

(22) Filed: May 7, 2003

(65) Prior Publication Data
US 2004/0223075 A1   Nov. 11, 2004

(51) Int. Cl.
H04N 5/238   (2006.01)
H04N 5/235   (2006.01)
H04N 5/222   (2006.01)
G03B 7/00    (2006.01)

(52) U.S. Cl. .................. 348/367; 348/362; 348/370
(58) Field of Classification Search .......... 348/340, 348/342, 362, 367, 370
See application file for complete search history.

(56) References Cited

U.S. PATENT DOCUMENTS

| | | | |
|---|---|---|---|
| 5,619,266 A * | 4/1997 | Tomita et al. | 348/363 |
| 5,758,220 A | 5/1998 | Miyadera | |
| 6,385,122 B1 | 5/2002 | Chang | |
| 6,404,991 B2 | 6/2002 | Gfeller | |
| 6,424,556 B1 | 7/2002 | Kablanian et al. | |
| 6,466,504 B1 | 10/2002 | Roy | |
| 6,483,094 B1 | 11/2002 | Yahav et al. | |
| 7,019,780 B1 * | 3/2006 | Takeuchi et al. | 348/340 |
| 7,126,629 B1 | 10/2006 | Braunstein et al. | |
| 2001/0055064 A1 | 12/2001 | Minakami | |
| 2002/0021901 A1 | 2/2002 | Shimizu | |
| 2002/0080245 A1 | 6/2002 | Parulski et al. | |
| 2002/0113881 A1 | 8/2002 | Funston et al. | |
| 2002/0154232 A1 | 10/2002 | Tull | |
| 2002/0158987 A1 | 10/2002 | Shimizu | |
| 2002/0196345 A1 * | 12/2002 | No | 348/207.2 |
| 2003/0052989 A1 * | 3/2003 | Bean et al. | 348/362 |

FOREIGN PATENT DOCUMENTS

WO   WO 01/69651 A2   9/2001

OTHER PUBLICATIONS

Ming Xu and Deng-Ke Yang "Dual Frequency Cholesteric Light Shutters", American Institute of Physics, Appl. Phys. Lett. vol. 70, No. 6, Feb. 10, 1997.*

(Continued)

Primary Examiner—Lin Ye
Assistant Examiner—Kelly Jerabek
(74) Attorney, Agent, or Firm—Rutan & Tucker LLP

(57) ABSTRACT

Various methods, apparatuses, and systems in which a digital photography device includes a rolling shutter, a sensor, and a flash are described. The sensor implements a rolling shutter timing mechanism. The shutter includes a material that has an alterable translucent state. The shutter is in the optical path of light going to the sensor. The flash generates a pulsed illumination. The alterable translucent state of the shutter controls the sensor's exposure to the photographic effects of ambient light during a picture using the pulsed illumination.

21 Claims, 7 Drawing Sheets

OTHER PUBLICATIONS

International Search Report for International Application No. PCT/US2004/014341, date mailed: Oct. 19, 2004, pp. 2 total.

"Shutter Operations for CCD and CMOS Image Sensors," Image Sensor Solutions, Eastman Kodak Company, Application Note, MTD/PS-0259, Revision 1, Oct. 23, 2001.

Wany, Martin, "High Dynamic CMOS Image Sensors," G.I.T. Imaging & Microscopy, pp. 26-28, G.I.T. Verlag, Germany, Mar. 2001.

Litwiller, Dave, "CCD vs. CMOS: Facts and Fiction," Photonics Spectra, 5 pgs., Jan. 2001.

\* cited by examiner

DIGITAL PHOTOGRAPHY DEVICE HAVING A ROLLING SHUTTER

FIELD OF THE INVENTION

Embodiments of the invention generally relate to digital photography devices. More particularly, an aspect of an embodiment of the invention relates to digital photography devices having a rolling shutter.

BACKGROUND OF THE INVENTION

Digital cameras sample the original light that bounces off a subject to create a digital image. A digital camera may use a shutter in combination with a sensor to determine an exposure time and acquire the proper amount of light to make a good image. The proper amount of light may come from accumulating ambient light over time until the proper amount of light is obtained. Alternatively, the addition of artificial light from a flash speeds up the amount of time until the proper amount of light is obtained to make a good image.

In a typical mechanical shutter, the timing between scan lines of a sensor and the actuation of the shutter is such that the shutter would be closed until the sensor, such as a complementary metal-oxide semiconductor (CMOS) sensor or a Charge Coupled Device (CCD) sensor, was ready to be exposed to the light in the picture frame. When the mechanical shutter opens it goes to a very discrete second distinct state. In the second distinct state, nearly 100% of the light is allowed to pass and be sensed by light sensitive pixels in the sensor. When the mechanical shutter gives the command to close, and the shutter closes and then the light no longer reaches the sensor.

CMOS sensors with a rolling shutter may have a relatively slow exposure time when a flash is required. Typically, the exposure time may be greater than 1/10th of a second. Often, in a scene having ambient light, the scene may be exposed for 1/8th of a second, which means a hand-held camera may yield a blurry photograph. In a sensor implementing a rolling shutter, the light accumulating pixels in the sensor both track the accumulation of charge and are read out in a pixel line by pixel line manner. Since the integration process moves through the image over some length of time, some motion artifacts may become apparent. For example, if a vehicle is moving through the image during capture, then light from the top of vehicle will be integrated at some earlier time than light from the bottom of the vehicle, causing the bottom of the vehicle to appear slanted forward in the direction of motion.

Some digital cameras have a mechanical shutter mechanism to control the exposure time of the CMOS sensor. Unfortunately, the inclusion of mechanical shutter adds significant expense to the cost of a camera. Further, a mechanical shutter due to its size and dimensions may add physical bulkiness to the camera.

Additionally, in some digital cameras, after a flash flashes, the ambient light reflecting off the objects in the picture frame while the mechanical shutter is open may cause problems due to the movement of those objects. For example, if the photoflash provides 75% of the exposure light and the ambient light provides the remaining 25% over the entire integration time, then the light from ambient source can cause a ghost image or blurring on the resultant digital image due to the movement of the objects.

Some cameras may have sensors implementing a global shutter timing mechanism for the light sensitive pixels. These sensors have electronic components added to each pixel location in the sensor. Typically, in a sensor implementing a global shutter timing mechanism all the pixels begin the integration time at the same time, integrate over the same interval of time, and at each pixel are simultaneously transferred to a light insensitive storage area at the same time. Therefore, sensors employing a global shutter timing mechanism typical have little to no potential for motion artifacts.

SUMMARY OF THE INVENTION

Various methods, apparatuses, and systems in which a digital photography device includes a shutter, a sensor, and a flash are described. The sensor implements a rolling shutter timing mechanism. The shutter includes a material that has an alterable translucent state. The shutter is in the optical path of light going to the sensor. The flash generates a pulsed illumination. The alterable translucent state of the shutter controls the sensor's exposure to the photographic effects of ambient light during a picture using the pulsed illumination.

BRIEF DESCRIPTION OF THE DRAWINGS

The drawings refer to embodiments of the invention in which.

Figure 1:
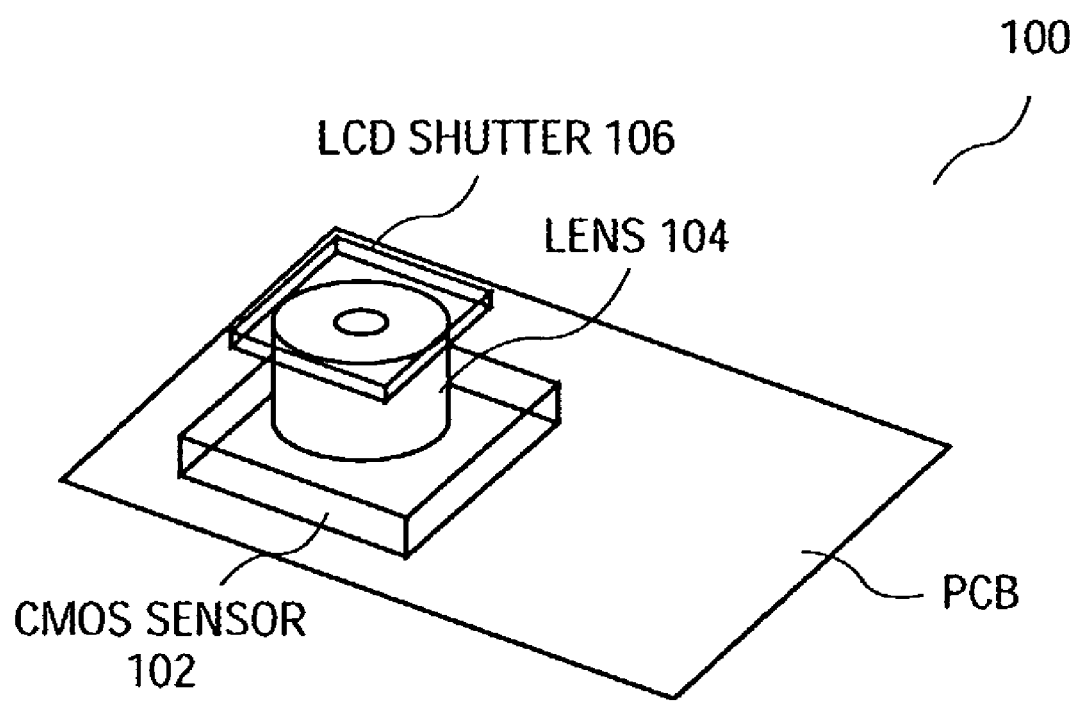
FIG. 1 illustrates an assembly diagram of a portion of an embodiment of a digital photography device that focuses incoming light onto a light sensitive sensor through a rolling shutter.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific optical paths, named components, connections, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first translucent state, may be made. However, the specific numeric reference should not be interpreted as a literal sequential order but rather interpreted that the first translucent state is different than a second translucent state. Thus, the specific details set forth are merely exemplary. The specific details may be varied from and still be contemplated to be within the spirit and scope of the present invention. The term coupled is defined as meaning connected either directly to the component or indirectly to the component through another component.

In general, various methods, apparatuses, and systems are described in which a digital photography device includes a shutter, a sensor, and a flash. The sensor implements a rolling shutter timing mechanism. The shutter includes a material that has an alterable translucent state. The shutter is in the optical path of light going to the sensor. The flash generates a pulsed illumination. The alterable translucent state of the shutter controls the sensor's exposure to the photographic effects of ambient light during a picture using the pulsed illumination. The shutter may transition from a nearly opaque translucent state at approximately the beginning of an integration time to a second translucent state at approximately the occurrence of the pulsed illumination when the picture is being taken. The shutter may also transition from the second translucent state at approximately the beginning of an integration time to the nearly opaque translucent state at approximately the occurrence of the pulsed illumination, or another similar mode of operation.

FIG. 1 illustrates an assembly diagram of a portion of an embodiment of a digital photography device that focuses incoming light onto a light sensitive sensor through a shutter. The digital photography device 100, such as a digital camera, may focus incoming light onto a light-sensitive, semiconductor sensor 102 through a lens 104 and a shutter 106. The composition of the shutter 106 includes a material that has an alterable translucent state, such as Liquid Crystal Display (LCD) shutter. The sensor 102, such as an N mega pixel complementary metal-oxide semiconductor (CMOS) sensor, may include an array of evenly spaced, discrete light-sensing elements, called pixels. N may be any number such as 1.3 mega pixels. The sensor may implement a pixel line by pixel line integration timing mechanism such as a rolling shutter timing mechanism. The digital photography device 100 may also have a flash or similar device to cause a pulsed illumination. The alterable translucent state of the shutter 106 controls the sensor's exposure to the photographic effects of ambient light during a flash photography shot. The shutter 106 controls or reduces the amount of blur or ghosting images in the resultant digital file of a digital image by reducing the negative potential photographic effects of potential movement of objects within that picture frame of time when the digital image is taken. The shutter 106 includes a material that has an alterable translucent state. The shutter 106 may have a nearly opaque translucent state that passes, for example, less than 10 percent of the incoming light to the sensor 102 and a second translucent state that passes, for example, at least 30% but less than 75% of the incoming light to the sensor 102. The shutter 106 may also polarize incoming light going to the sensor 102 to reduce extraneous light from a particular direction during a picture when the flash is not actuated. The shutter 106 may also operate as a neutral density filter to enhance contrast in a resultant digital file of a digital image.

Figure 2:
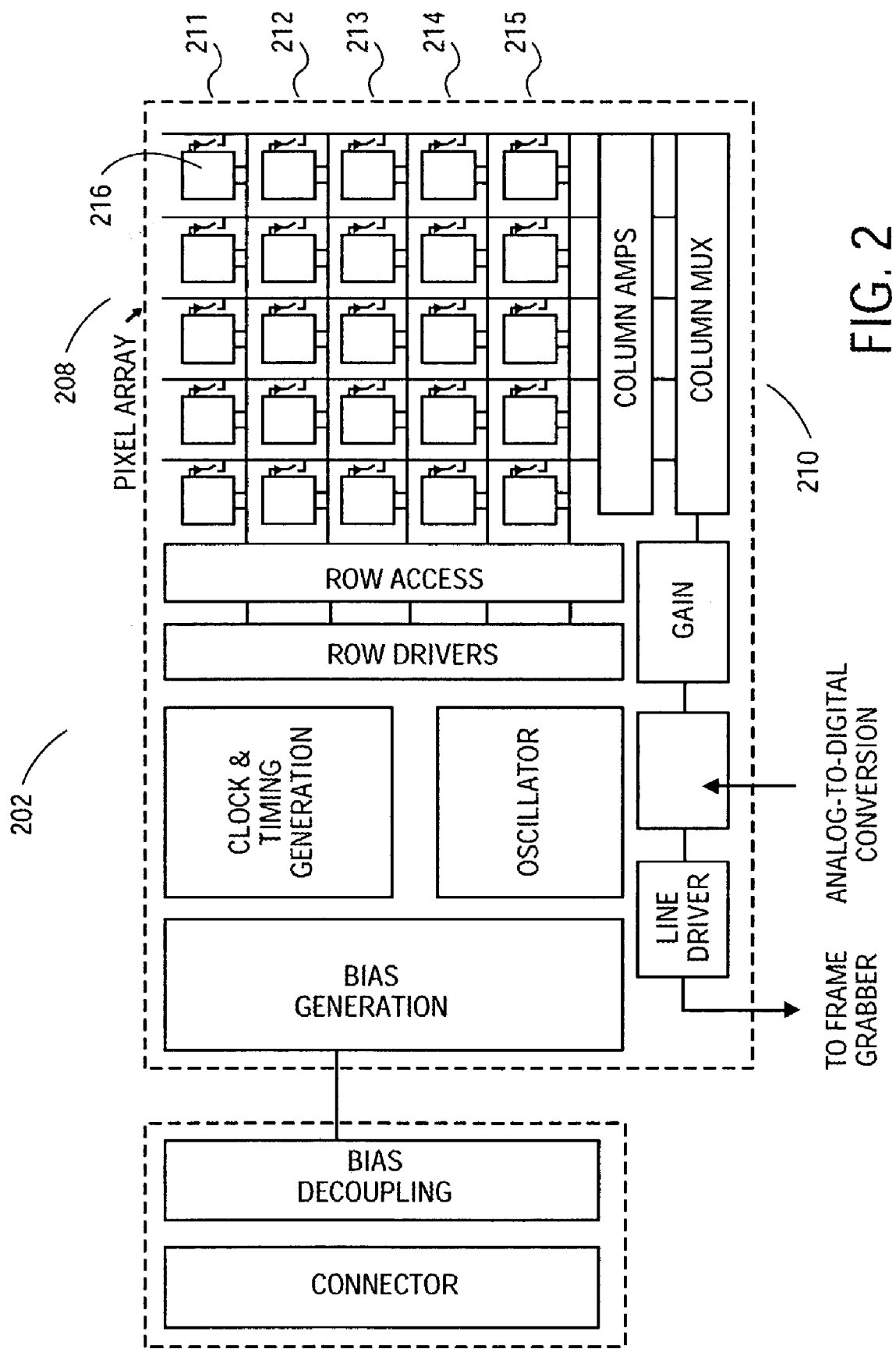
FIG. 2 illustrates a block diagram of an embodiment of an example semiconductor sensor circuit.

FIG. 2 illustrates a block diagram of an embodiment of an example semiconductor sensor circuit. The sensor 202 may include an array of pixels 208 and circuitry 210 to direct the operation of the pixels. The pixels may be organized into lines of pixels 211-215 aligned horizontally across the light sensitive portion of the sensor 202. Each pixel, such as a first pixel 216, acts as an optoelectric converter because a pixel becomes electrically "charged" to a level directly proportional to the amount of light that strikes the pixel during a given time period, called the integration time. The circuitry 210 directs the overall integration time including the timing of when each pixel should start tracking the accumulated light striking that pixel. The shutter is positioned in optical path between the incoming light and the sensor 202 to cooperate with the rolling shutter timing mechanism to control the exposure time for all of the lines of pixels 211-215 in the sensor 202. The accumulated charge from light striking each pixel in the lines of the array 211-215 may read out line by line. After a line is read out completely, that line may be put into a reset state.

Thus, the pixel array 208 captures an image by converting the light from objects in the picture frame into an electrical charge stored by those pixels 211-215 which make up the pixel array 208. The amount of the electrical charge stored by each pixel depends on the amount of the light that falls on the imager, both in terms of intensity and duration.

The sensor 202 implements a rolling shutter timing mechanism such that the light accumulating pixels in the sensor both track the accumulation of charge and are read out in a pixel line by pixel line manner. The beginning of the integration time for each pixel is period in time in which that pixel begins the accumulation of charge from converting light. The lines/rows of pixels 211-215 in the image sensor 202 begin the integration time in sequence. The pixel array 208 accumulates light from the objects in the picture frame starting at the top of the image and proceeds line by line to the bottom of the image. When the integration process has moved some distance down the image, the readout process of lines of pixels begins. The lines of pixels 211-215 are read out in sequence, starting at the top of the image and proceeding line by line to the bottom. The time period between a first row of pixels 211 starting the accumulation of charge and a last row of pixels 215 starting to be read may be considered the integration time.

Each photo-site in a CMOS sensor array may have its own amplifier and output circuitry to allow each photo-site to be read out independently of the other photo-sites. The rolling shutter timing mechanism may reduce the number of in-pixel transistors improving fill factor.

Figure 3:
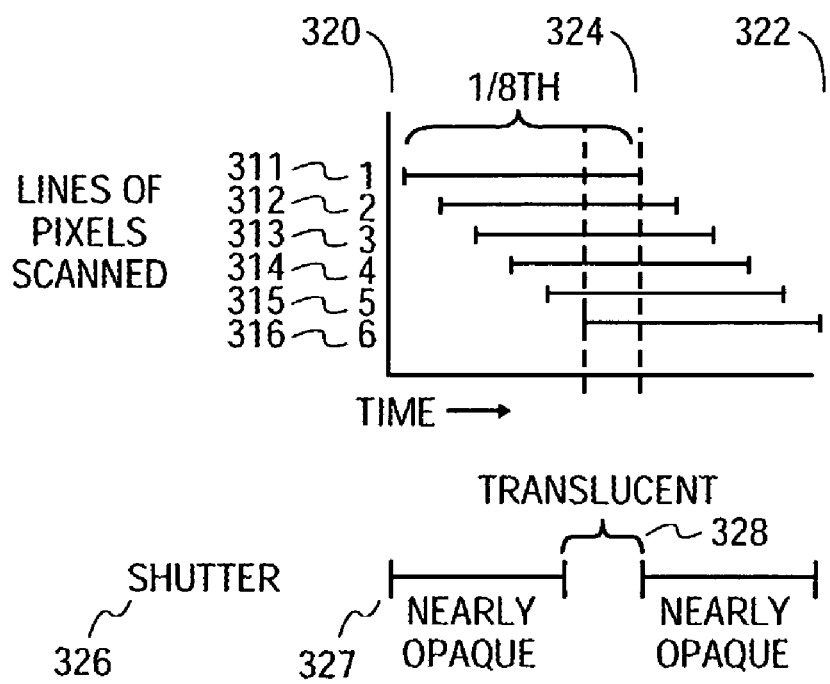
FIG. 3 illustrates a graph of an embodiment of lines of pixels in the sensor accumulating charge from light striking each pixel in the lines of the array versus time.

FIG. 3 illustrates a graph of an embodiment of lines of pixels in the sensor accumulating charge from light striking each pixel in the lines of the array versus time. An example six scan lines of pixels 311-316 may be present in a frame of a picture. The sensor circuitry may stagger the sequential analysis of each line of pixels 311-316. The sensor circuitry may also stagger the starting point of when each line of pixels 311-316 keeps track of and accumulates charge from incoming light. The six scan lines 311-316 may sequentially start one right after another. A first scan line 311 may start to track the accumulation of light at the beginning of the integration time 320. A second scan line 312 may start to track the accumulation of light in the pixels in that line a short time later. The process may continue for all of the remaining lines of pixels 313-316 in the sensor. When the last line of pixels, for example the sixth line 316, stops tracking the accumulation of charge that may be the end of the integration time 322. Each frame will be a composite of the horizontal scan lines 311-316 going across the sensor. The shutter and the sensor circuitry implementing the rolling shutter timing mechanism work together to capture the proper amount of light needed to make a good image. The dashed line 324 indicates a segment in time where a picture is taken when a device such as a flash creates a pulsed illumination. The alterable translucent state shutter 326 controls the sensor's exposure to the photographic effect of ambient light during the pulsed illumination picture in order to reduce blur and ghost imaging in a resultant digital image. The shutter will have transitioned from a nearly opaque state 327 at approximately the beginning of the integration time 320 to a second translucent state 328 at approximately the occurrence the pulsed illumination when the picture is being taken. The accumulated light from the horizontal scan lines 311-316 from the beginning of the integration time 320 to the end of the integration time 322 may be processed to create a digital file of a digital image.

Referring to FIG. 1, the shutter 106, such as a liquid crystal display, may be made up of tiny molecules that bend, reflect, absorb, or don't bend light. The shutter 106 in a translucent state allows light to pass through the liquid crystal shutter in a certain percentage or range. A liquid crystal display shutter when energized redirects the light to be absorbed in devices such as polarizers causing less incoming light to pass through to the sensor. Circuitry for the shutter 106 may include standard Liquid Crystal Display logic to electrically control the operation of the rolling shutter.

Figure 4:
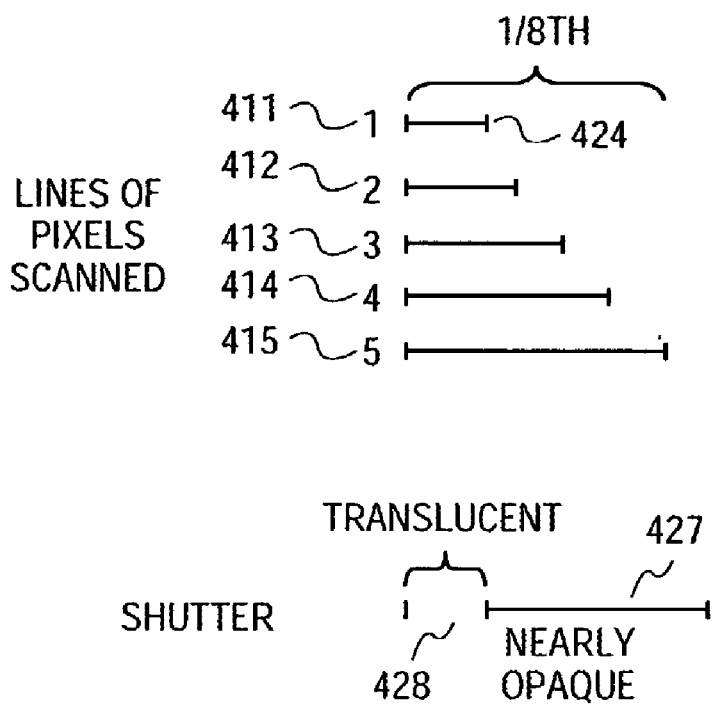
FIG. 4 illustrates a graph of an embodiment of lines of pixels in the sensor accumulating charge when the picture is being taken versus time.

FIG. 4 illustrates a graph of an embodiment of lines of pixels in the sensor accumulating charge when the picture is being taken versus time. The shutter and the circuitry controlling the tracking of accumulated charge in the pixels may be timed such that when the shutter is in a translucent state 428 passing, for example, 50-70 percent, of the incoming light to the sensor, the horizontal scan lines 411-415 for the frame all start tracking of their individual accumulation charge starting at approximately that same time rather than being staggered. The dashed line 424 indicates a segment in time where a picture is taken when a device such as a flash creates a pulsed illumination and correspondingly timed the shutter is in a translucent state 428 to pass a significant amount of light to the sensor. The first scan line 411 processes light from objects within the frame while the shutter is in this translucent state. However, starting at the second pixel line 412 down to the fifth scan line 415, the CMOS sensor continues to process or gain accumulated light information from these scan lines. The second pixel line 412 through the fifth pixel line 415 keep receiving input from ambient light reflecting off of the objects in the image. The translucent states of the shutter 427, 428 limit this extra information from causing a blurriness or ghost imaging on the resultant digital image.

Figure 5:
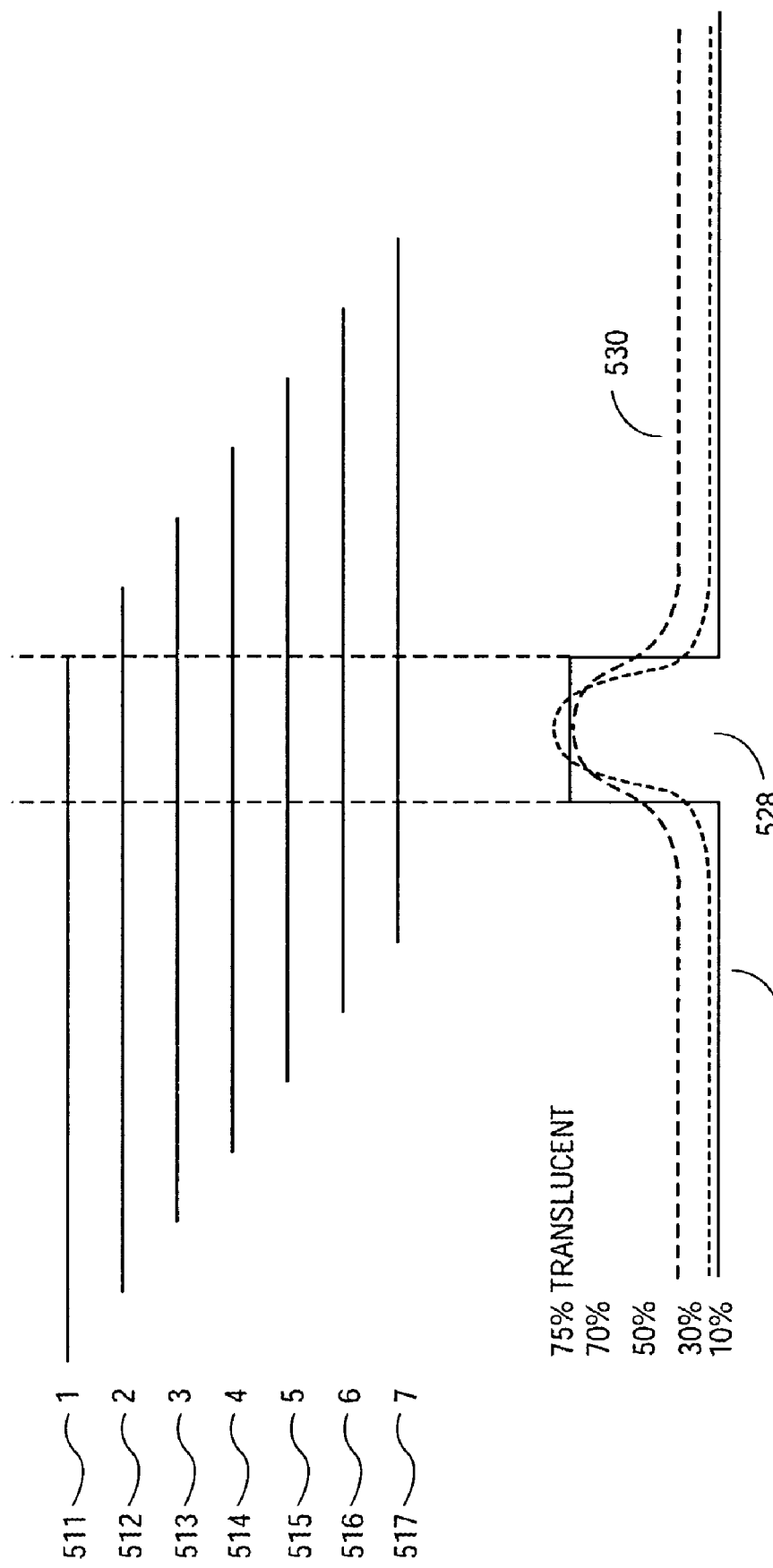
FIG. 5 illustrates a graph of an embodiment of a rolling shutter having a gradual transition of the alterable translucent states from a nearly opaque translucent state to second translucent state timed with the overall integration time when a flash occurs in a picture.

FIG. 5 illustrates a graph of an embodiment of a shutter made of translucent material having a gradual transition of the alterable translucent states from a nearly opaque translucent state to second translucent state timed to be in synch with when a flash occurs in a picture. An example seven scan lines of pixels 511-517 may be present in a frame of a picture. The sensor circuitry may also stagger the starting point of when each line of pixels 511-517 keeps track of and accumulates charge from incoming light. The shutter being composed of a material having an alterable translucent state may gradually change its ability to pass light over time. The example shape of this passing of incoming light is sinusoidal. The shutter transitions at approximately an occurrence of a pulsed illumination when the picture is being taken to a second translucent state 528 passing at least 30% but less than 70% of the incoming light to the sensor from a nearly opaque translucent state 527 passing less than 10 percent of the incoming light to the sensor at approximately the beginning of an integration time.

In a nominal translucent state, the rolling shutter may pass less than 75 percent of the input light. The shutter having an alterable translucent state also polarizes incoming light to reduce extraneous light from a particular direction during the non-flash digital photography shots. The shutter having an alterable translucent state also may operate as a neutral density filter to enhance contrast in a resultant digital file of a digital image.

However, when the shutter button of the digital photography device is pressed, the rolling shutter may be energized causing the molecules of the, for example, liquid crystal display, to redirect the input light to be absorbed or scattered and thus passes less and less light. When the rolling shutter is established in this nearly opaque state, the integration time may begin. Each scan line 511-517 may sequentially start tracking accumulated charge from the input light. The shutter whose composition includes a material having an alterable translucent state may gradually transition from a "closed state" passing very little light to an "open state" and back to a "closed state" over time. The integration time may end when the last line of pixels, such as the seventh line 517, stops tracking the amount of light accumulated. In the "open state" translucent state 528, the shutter may pass, for example, at least 30% but less than 70% of the incoming light to the sensor. In another example translucent state 530, the "open state" translucent state 528 of the shutter passes at least 50% but less than 75% of the incoming light to the sensor or some other similar discrete translucent state from the nearly opaque translucent state.

Figure 6:
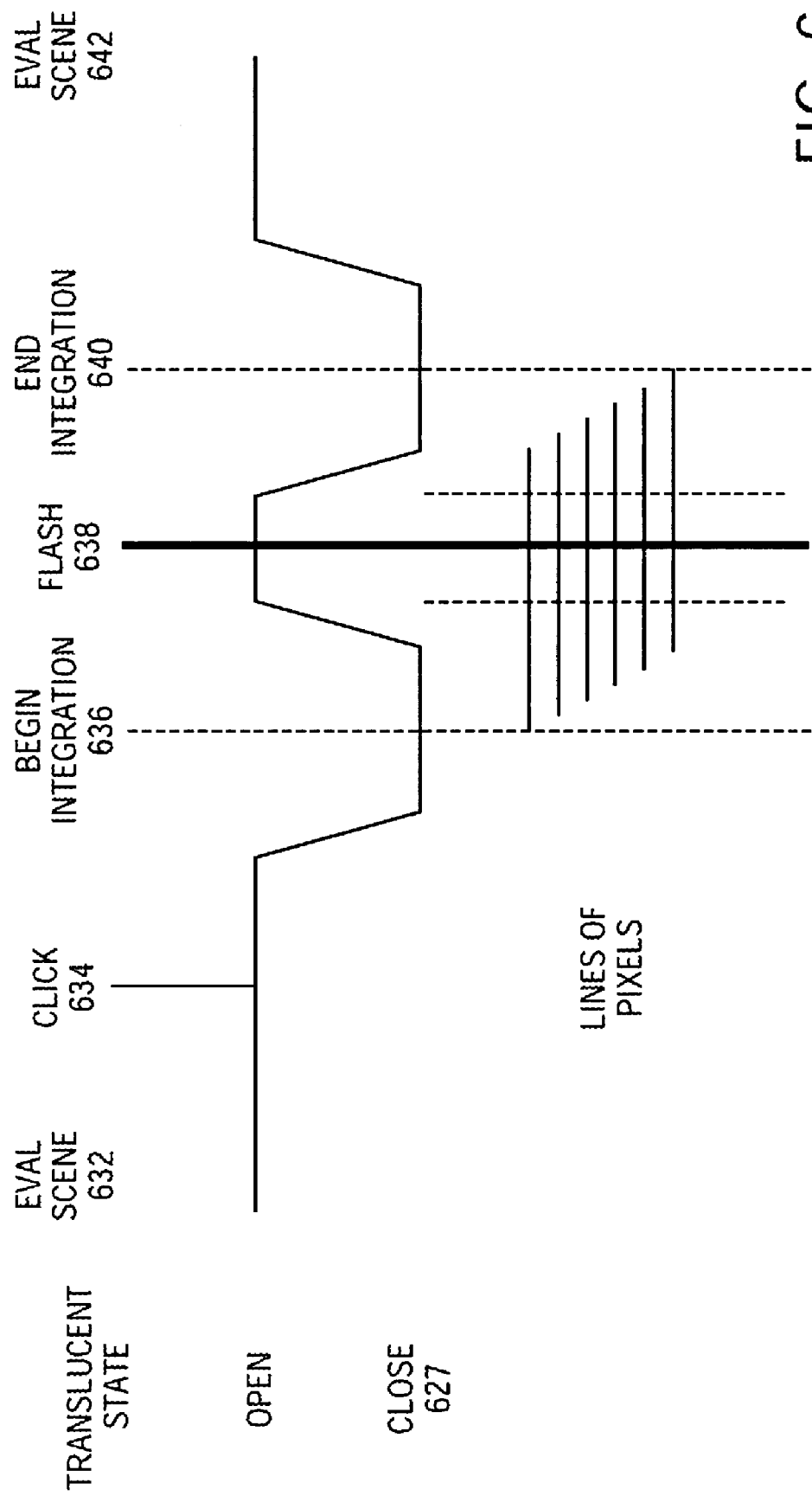
FIG. 6 illustrates an example sequence of operations for an embodiment of the digital photograph device having a rolling shutter with an incremental response curve.

FIG. 6 illustrates an example sequence of operations for an embodiment of the digital photograph device having a shutter with an incremental response curve. The shutter may be in a nominal translucent state, unenergized, and passing ambient scene light to the sensor so that the digital photography device can constantly be evaluating 632 the ambient light condition of the photographic scene. A user may depress a shutter button 634. When the user depresses the shutter button, a signal is then sent to the shutter to energize. When the energizing signal is received, the material having an alterable translucent state then starts turning opaque and blocking the amount of light that can reach the sensor. A shutter with an incremental response curve transitions to translucent states, such as of being nearly opaque, in an immediate discrete nature. When the shutter is in it's opaque state 627 then the sensor may implement the rolling shutter timing mechanism and start the integration process of evaluating the horizontal scan lines for the picture frame of the resultant digital image. A first time period may occur before the start of the integration period 636. The integration period starts with an algorithm directing the sensor to capture or pay attention to the amount of light being exposed to the sensor in order to process that data to generate a resultant digital image. After the integration time is started, the algorithm directs the liquid crystal display to transition to its translucent state 628. For a fast shutter with an incremental response curve, the shutter transitions to the translucent state 628 almost immediately. When the liquid crystal display is in this open or translucent state 628, the flash may generate a pulsed illumination 638. A period of time after the flash fires, based upon roughly on the ASA speed of the sensor, the liquid crystal display will transition to the nearly opaque translucent state in order to end the exposure time for the sensor being exposed to the light. Next, after the last pixel line for that particular frame is done being received and processed, then that signifies the end of the integration period 640. The sensor no longer pays attention to the amount of incoming light in order to generate a resultant digital image. The processor processes all the data on the captured light in the frame of the picture in order to generate the resultant digital image. The shutter may then transition once again to its open state and evaluate ambient scene light 642 again for the next digital photography picture to be taken.

Figure 7:
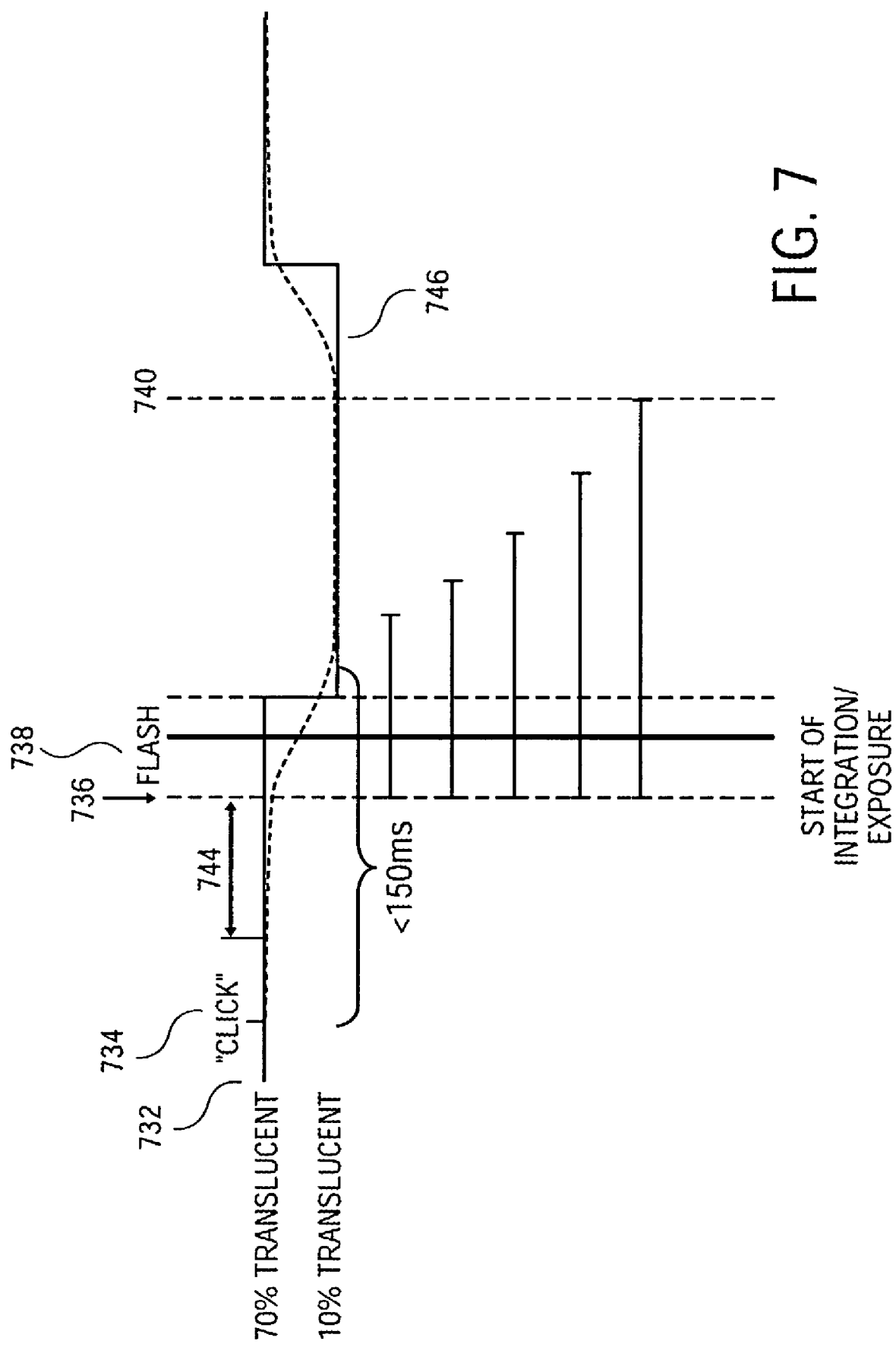
FIG. 7 illustrates an example sequence of operations for an embodiment of the digital photograph device having a rolling shutter with a gradual transition from a translucent state to an opaque state.

FIG. 7 illustrates an example sequence of operations for an embodiment of the digital photograph device having a shutter with a gradual transition from a translucent state to an opaque state. The shutter may be in a nominal open state evaluating ambient light conditions 732. In a nominal open state, a shutter composed of, for example, a liquid crystal display may be in a not energized state and thus consume very little power. A user may depress the shutter button 734 to direct the digital photography device to start taking a picture. The command for the shutter to start transitioning from the open/translucent state to the nearly opaque state occurs. A first time period 744 occurs. The first time period 744 is a time period where the transitioning is occurring from the translucent state to the nearly opaque state; however, the transitioning is just beginning to occur. After the passing of the first time period 744, the start of the integration period 736 occurs and the lines of pixels track the accumulated light in the frame of the digital picture being taken. At a second time period 738, when the shutter is in this second translucent state, the strobe generates a pulsed illumination. The shutter may operate in a translucent state passing at least 30% but less than 70% of the input light to the sensor approximately when in synch with the pulsed illumination of the flash. Next, the slow shutter continues to transition to the nearly opaque state. Next, a slight time period later, the sensor will get the command to stop the integration period 740. The sensor begins to read out the last line in the pixel array and starts processing the data from the pixel lines in that particular frame for the resultant digital image. The sensor, such as a 1.3 megapixel CMOS sensor, generates a resultant digital file of a digital image based off the amount of light sensed from each pixel in the sensor during the integration period. Next, after the integration period has completed, the rolling shutter is directed to once again transition from the nearly opaque state back to the fully translucent state. When the rolling shutter is in the fully translucent state, then the digital photography device once again evaluates ambient light for the next potential digital picture to be taken.

Figure 8:
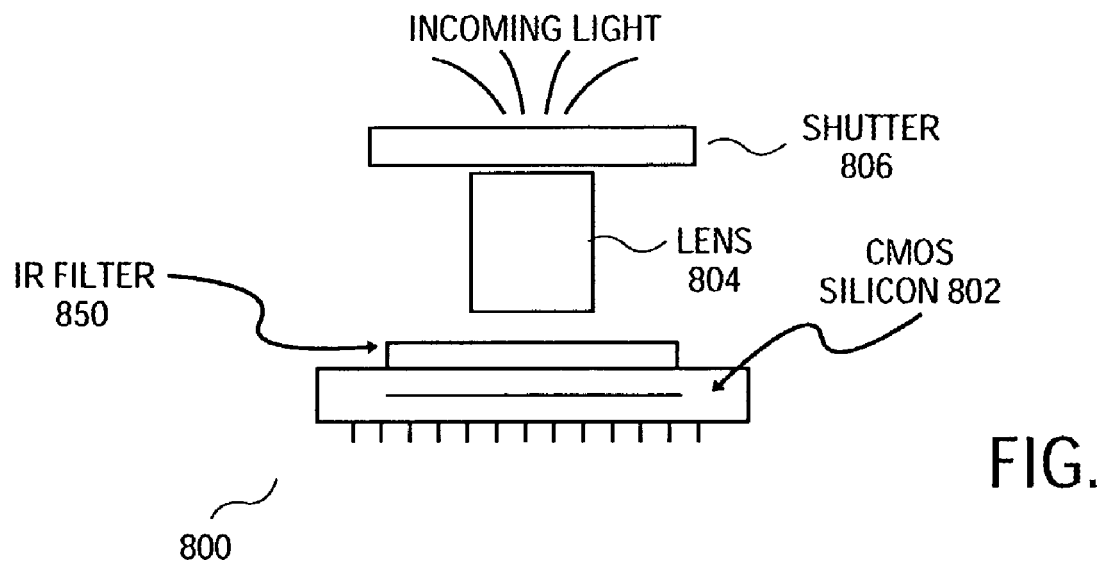
FIG. 8 illustrates an assembly diagram of an embodiment of the rolling shutter in the optical path of input light going to the sensor.

FIG. 8 illustrates an assembly diagram of a partial embodiment of the rolling shutter in the optical path of input light going to the sensor. The shutter 806 is placed prior to the lens 804. The lens 804 is placed prior to an infrared filter 850 that is bonded to the sensor 802. Note, the physical space occupied by a shutter 106, such as a LCD screen, has a smaller construction depth requirement than a comparable mechanical shutter. As a result, the digital photography device 800 may have a more compact optical path and physical dimensions. The digital photography device 800 may be a digital camera, a one-time use digital camera, a cellular phone operable to take digital pictures, or other similar device.

Figure 9:
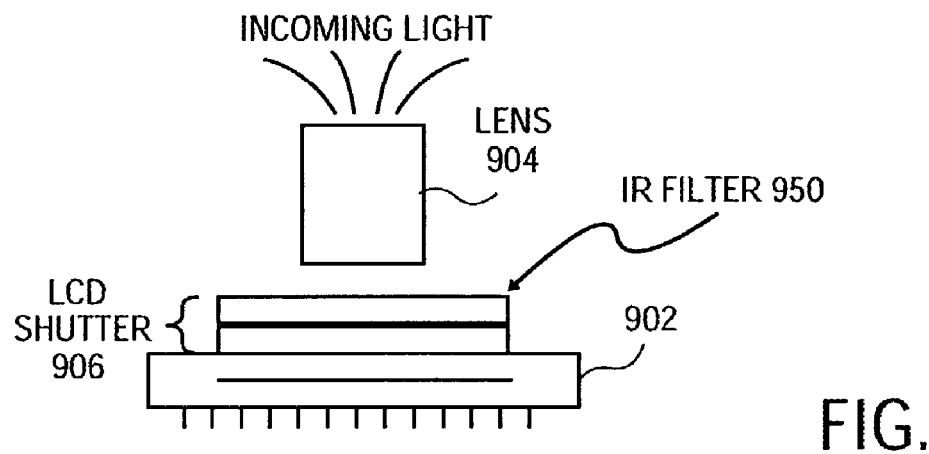
FIG. 9 illustrates an assembly diagram of a light path in an embodiment of the digital photography device.

FIG. 9 illustrates an assembly diagram of a light path in an embodiment of the digital photography device. The lens 904 is placed in the optical path prior to shutter 906, the infrared filter 950, and the sensor implementing the rolling shutter timing mechanism 902. In an embodiment, a shutter composed of liquid crystal display may be an integral unit with the infrared filter 950. Both the liquid crystal display shutter 906 and the infrared filter 950 are placed in the optical path prior to the CMOS sensor 902.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in the sensor circuitry. The material having an alterable translucent state may have an electrically controllable translucent characteristic. The sensor may be a CMOS sensor, a Charge Coupled Device sensor, or other similar sensor. The flash source of the pulsed illumination may be internal or external to the digital photography device. The invention is to be understood as not limited by the specific embodiments described herein, but only by scope of the appended claims.

What is claimed is:

1. A digital photography device, comprising:
a sensor implementing a rolling shutter timing mechanism;
a shutter including a material having an alterable translucent state, wherein the shutter has a gradual transition curve from a first translucent state to a second translucent state and the shutter is in the optical path of light going to the sensor;
a flash to generate a pulsed illumination, the alterable translucent state of the shutter to control the sensor's exposure to the photographic effects of ambient light during a picture using the pulsed illumination; and
logic to detect a pressing of an actuator that triggers the flash, wherein the logic to synch up a changing amount of light being allowed to pass through the shutter having the alterable translucent states during the gradual transitioning of the shutter from the first translucent state to the second translucent state with an operation of the rolling shutter and a time period when the pulsed illumination occurs.

2. The digital photography device of claim 1, wherein the sensor is a complementary metal-oxide semiconductor sensor.

3. The digital photography device of claim 2, wherein circuitry controlling operation of the shutter to transition the shutter from a first translucent state to a second translucent state to control the sensor's exposure to the photographic effects of potential movement of objects within the picture.

4. The digital photography device of claim 2, wherein the digital photography device is one of a digital camera, a one-time use digital camera, or a cellular phone operable to take digital pictures.

5. The digital photography device of claim 1, wherein the shutter is a liquid crystal display shutter.

6. The digital photography device of claim 5, wherein the shutter is prior to an infrared filter in the optical path going to the sensor.

7. The digital photography device of claim 1, wherein the shutter at approximately an occurrence of a pulsed illumination when the picture is being taken to have transitioned to a second translucent state passing at least 30 percent but less than 70 percent of incoming light going to the sensor from a first translucent state passing less than 10 percent of the incoming light to the sensor at approximately a beginning of an integration time.

8. The digital photography device of claim 1, wherein the shutter has a first translucent state that passes less than 10 percent of incoming light to the sensor and a second translucent state that passes at least 30 percent but less than 70 percent of the incoming light to the sensor.

9. The digital photography device of claim 8, wherein the second translucent state to pass at least 50 percent but less than 70 percent of the incoming light to the sensor.

10. The digital photography device of claim 1, wherein the shutter is prior to a lens in the optical path going to the sensor.

11. The digital photography device of claim 1, wherein the shutter is after a lens in the optical path going to the sensor.

12. A digital photography device, comprising:
a shutter including a material having an alterable translucent state and a gradual transition from a first translucent state to a second translucent state;
a lens;
a complementary metal-oxide semiconductor (CMOS) sensor implementing a rolling shutter timing mechanism, wherein the shutter is in an optical path of light going to the sensor;
a pulsed illumination device to provide a pulsed illumination; and
logic to transition a shutter, at approximately an occurrence of the pulsed illumination when the picture is being taken, to the second translucent state passing at least 30 percent but less than 75 percent of the incoming light to the CMOS sensor from the first translucent state passing less than 10 percent of incoming light to the CMOS sensor at approximately a beginning of an integration time.

13. The digital photography device of claim 12, wherein the shutter to operate in a first translucent state when in synch with a pulsed illumination of a flash, the first translucent state passes at least 30 percent but less than 70 percent of incoming light to the sensor approximately.

14. The digital photography device of claim 12, wherein the shutter has a first translucent state that passes less than 10 percent of incoming light to the sensor and a second translucent state that passes at least 50 percent but less than 70 percent of the incoming light to the sensor.

15. The digital photography device of claim 12, further comprising:
liquid crystal display logic to electrically control an operation of the shutter.

16. The digital photography device of claim 12, wherein the shutter to polarize incoming light to reduce light from a particular direction during a picture.

17. The digital photography device of claim 12, wherein the shutter to operate as a neutral density filter to enhance contrast in a resultant digital file of a digital image.

18. A method for a digital photography device, comprising:
tracking an amount of light being exposed to a sensor implementing a pixel line by pixel line integration timing mechanism when a picture is being taken, wherein the sensor is a complementary metal-oxide semiconductor (CMOS) sensor implementing a rolling timing mechanism; and
transitioning a shutter at approximately an occurrence of a pulsed illumination when the picture is being taken to a second translucent state passing at least 30 percent but less than 75 percent of the incoming light to the sensor from a first translucent state passing less than 10 percent of incoming light to the CMOS sensor at approximately a beginning of an integration time, wherein the shutter includes a material having an alterable translucent state and a gradual transition from the first translucent state to the second translucent state.

19. The method of claim 18, further comprising:
processing the amount of light exposed to pixels in the CMOS sensor to generate a file representing a digital image.

20. An apparatus, comprising:
means for tracking an amount of light being exposed to a sensor implementing a pixel line by pixel line integration timing mechanism when a picture is being taken, wherein the sensor is a complementary metal-oxide semiconductor (CMOS) sensor implementing a rolling timing mechanism;
a means for a pulsed illumination; and
means for transitioning a rolling shutter from a first translucent state passing less than 10 percent of incoming light to the CMOS sensor at approximately a beginning of an integration time to be in a second translucent state passing at least 30 percent but less than 75 percent of the incoming light to the sensor at approximately an occurrence of the pulsed illumination when the picture is being taken, wherein the shutter includes a material having an alterable translucent state and a gradual transition from the first translucent state to the second translucent state.

21. The apparatus of claim 20, further comprising:
means for processing the amount of light exposed to pixels in the CMOS sensor to generate a file representing a digital image.

* * * * *